United States Patent [19]
Pinschmidt, Jr. et al.

[11] Patent Number: 4,943,676
[45] Date of Patent: Jul. 24, 1990

[54] THERMOLYSIS OF POLY(N-VINYLFORMAMIDE) TO POLY(N-VINYLAMINE)

[75] Inventors: Robert K. Pinschmidt, Jr., Allentown, Pa.; Ta-Wang Lai, Novato, Calif.

[73] Assignee: Air Products and Chemicals, Inc., Allentown, Pa.

[21] Appl. No.: 378,731

[22] Filed: Jul. 12, 1989

[51] Int. Cl.$^5$ .............................................. C08F 8/12
[52] U.S. Cl. .................................. 525/383; 525/328.2; 528/481
[58] Field of Search .................... 525/383; 528/481

[56] References Cited

U.S. PATENT DOCUMENTS

| 4,255,548 | 3/1981 | Wingard, Jr. et al. | 525/328.2 |
| 4,393,174 | 7/1983 | Dawson et al. | 525/369 |
| 4,421,602 | 12/1983 | Brunnmueller et al. | 525/328.2 |
| 4,578,515 | 3/1986 | Dawson et al. | 564/215 |
| 4,623,699 | 11/1986 | Brunnmueller et al. | 525/355 |

FOREIGN PATENT DOCUMENTS 74529 6/1987 Australia .

Primary Examiner—Bernard Lipman
Attorney, Agent, or Firm—Michael Leach; James C. Simmons; William F. Marsh

[57] ABSTRACT

Poly(N-vinylformamide) is thermolytically reacted to yield poly(N-vinylamine).

6 Claims, No Drawings

THERMOLYSIS OF POLY(N-VINYLFORMAMIDE) TO POLY(N-VINYLAMINE)

TECHNICAL FIELD

The present invention relates to the preparation of poly(N-vinylamines) and, more particularly, relates to the preparation of poly(vinylamines) from poly(vinylamides).

BACKGROUND OF THE INVENTION

Poly(vinylamine [PVAm] is of considerable commercial interest because of its active primary amine functionality and high water solubility. Numerous applications of PVAm and its derivatives have been demonstrated, e.g., as flocculants in waste water treatment, as carriers for non-absorbable food dyes, catalysts, and drugs, as dye acceptors in synthetic fibers; and as constituents of ion-exchange resins. The difficulty in its preparation has kept PVAm from commercialization.

Considerable research effort has been devoted to developing economic synthetic routes to PVAm. To date, the most commercially attractive synthesis for PVAm is via hydrolysis of poly(N-vinylamides) which are prepared by radical polymerization of N-vinylamides. Hydrolysis of poly(N-vinylamides) especially poly(N-vinylacetamide) [PNVA] and poly(N-vinylformamide) [PNVF], to PVAm under acid or base conditions has been reported. These traditional hydrolysis methods use excess acid or base and produce the polyvinyl ammonium acid salt with substantial amounts of carboxylic acid or the alkali metal salt of the carboxylic acid as by-products. For many applications, further purification of PVAm is required, for example, by precipitating the polymer washing and redissolving it. These additional operations significantly increase the cost and complexity of producing salt-free polymers.

U.S. Pat. No. 4,623,699 discloses linear, basic polymer powders which contain polymerized vinylamine units prepared by eliminating the formyl groups from N-vinylformamide polymer powders with a gaseous hydrogen halide in the presence of not more than 5% by weight, based on the polymer used, of water.

U.S. Pat. No. 4,578,515 discloses the preparation of N-vinylformamide from ethylidene bisformamide, which monomer is useful in the preparation of active polymers and copolymers, including poly(vinylformamide) which can be hydrolyzed to (poly(vinylamine) salts by contact with acid. These amine salts can then be converted to the free amines.

U.S. Pat. No. 4,393,174 disclosed pendant amide polymers, especially polymers containing N-vinylacetamide, N-alkyl-N-vinylacetamide, or N-vinylformamide units, which are hydrolyzed to pendant amine polymers, especially vinylamine polymers by contact with a strong aqueous base at elevated temperature.

AU-A-74529/87 discloses vinylamine copolymers and in Example 1 shows the hydrous gel of a N-vinylformamide copolymer precursor was crushed into particles, mixed with methanol and hydrolyzed with aqueous hydrochloric acid under refluxing conditions.

SUMMARY OF THE INVENTION

The present invention provides a method for preparing the vinylamine polymer from a polymer containing polymerized units of N-vinylformamide [NVF] by a thermolytic reaction. The polymer containing NVF units is heated to a temperature sufficient to effect thermodecarbonylation to yield a polymer containing free amine functionality. In a preferred embodiment, the polymer is heated in the presence of water.

As an advantage, the present method provides a "salt-free" vinylamine polymer usable for high performance applications.

DETAILED DESCRIPTION OF THE INVENTION

The poly(N-vinylformamide) [PNVF] may be prepared from N-vinylformamide [NVF] by any conventional polymerization procedure, e.g., solution, bulk and inverse (water-in-oil) emulsion polymerization. Suitable procedures are taught in J61-14712 and J59-33312 with the inverse emulsion polymerization disclosed as EP No. 0,264,649-A being preferred for making very high molecular weight polymers. Homopolymers and copolymers of NVF may be suitably decarbonylated according to the present invention. The copolymers may contain up to 90 wt % copolymerizable monomer (s) such as, for example, ethylene, styrene and vinyl acetate.

PNVF undergoes thermodecarbonylation at elevated temperatures of about 200 °C. to 320° C., preferably 250° to 300° C. The pressures used in the reaction are typically 15 to 90 atm. Significant weight loss occurs at these elevated temperatures especially at about 280° C. and is ascribed to the loss of CO and the formation of an amidine linkage from adjacent formamide and amine groups with loss of water as shown in the following reaction sequence:

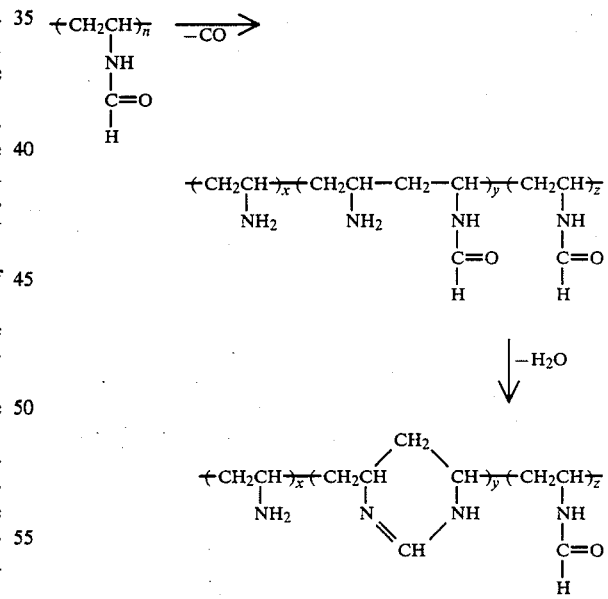

The transformation of the formamide functionality —NH—C(O)—H to the amidine functionality —N=CH—NH— has been confirmed by IR analysis.

The heating is effected for a period of time necessary to attain a suitable level of decarbonylation. i.e., formation of sufficient amine functionality, and may range from 0.01 to 6 hours.

The presence of water can suppress the unwanted amidine formation by driving the equilibrium reaction to the left:

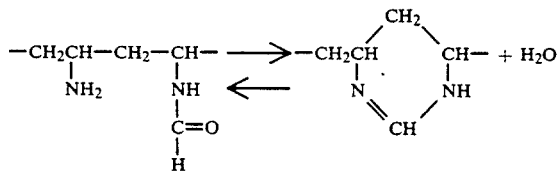

Thus it is preferred to effect the thermodecarbonylation of the polymer containing units of polymerized NVF in the presence of water to enhance the formation of vinylamine units.

EXAMPLE 1

PNVF Synthesis—In a 2 L three-necked round-bottom flask equipped with overhead stirrer, thermowatch and $N_2$ inlet/outlet were placed NVF (200 g), toluene (800 g), and AIBN (3.49 g). The polymerization was carried out at 65° C. for 4 hours under a nitrogen atmosphere. The polymer precipitated during the polymerization. At the end of the reaction, the resulting mixture was filtered. The granular polymer product was washed with acetone and dried, yielding 170 g.

EXAMPLE 2

Thermodecarbonylation of PNVF-absence of water—A sample of PNVF (Ex. 1) was placed in a platinum dish of a Perkin-Elmer thermogravimetric analyzer and pyrolyzed at 280° C. under nitrogen for 2 hr. KBr pellets were made of polymer before and after thermolysis and analyzed by IR spectroscopy. Reduction of the carbonyl band at 1675 $cm^{-1}$ and appearance of amidine functionality at 1610 $cm^{-1}$ was noted in the heated sample.

EXAMPLE 3

Synthesis of ethylene/N-vinylformamide copolymer—A stirred pressure reactor was charged with 1000 g of t-butanol, 100 g of NVF monomer and 2.84 g of AIBN initiator. The reactor was purged with nitrogen and pressurized to 500 psi with ethylene. The charge was stirred at 300 rpm and heated to 65° C. (initial pressure about 670 psi). The reaction was continued for 50 hr. The product was collected after precipitation from acetone and vacuum drying (150 g). Soxhlet extraction with water gave a water insoluble fraction rich in ethylene.

EXAMPLE 4

Thermodecarbonylation of ethylene/NVF copolymer—A sample of the copolymer from Example 3 was added to the platinum dish of a Perkin Elmer D thermogravimetric analyzer and heated isothermally at 310° C. for two hours. It showed a 10% weight loss over the first 30 min. Analysis by IR spectroscopy of a KBr pellet showed growth of new absorptions between 1650 and 1600 and partial loss of adsorption at 1675 $cm^{-1}$ indicating partial loss of amide functionality.

EXAMPLE 5

Thermodecarbonylation of PNVF-0.5 hr. absence of waterWhite PNVF powder, 10 g (Ex. 1), was added to a 250 mL 3-neck round bottom flask equipped with a mechanical stirrer, heating mantle and nitrogen purge. The powder was heated at 280° C. for 0.5 hr. The polymer became light beige and would no longer stir. The product was soluble in water, but not significantly soluble in methanol, t-butanol, toluene, methylene chloride, hexane or dimethylsulfoxide.

EXAMPLE 6

Thermodecarbonylation of PNVF - 2 hr. absence of water—White PNVF powder. 10 g (Ex. 1), was added to a 250 mL 3-neck round bottom flask equipped with a mechanical stirrer, heating mantle and nitrogen purge. The powder was heated at 280° C. for 2 hr. The polymer became light brown and would no longer stir. The product was not significantly soluble in water, methanol, t-butanol, toluene, methylene chloride, hexane or dimethylsulfoxide. Extended heating in excess 2:1 water/hydrochloric acid also gave, at best, only partial solution of the polymer.

EXAMPLE 7

Thermolysis of PNVF film—2 hr. absence of water—PNVF, 5 g (Ex. 1), was dissolved in 50 mL of water and poured into a 250 mL round bottom flask. The solvent was evaporated under reduced pressure on a rotary evaporator to give a polymer film on the flask. The flask was heated to 150° C. for 2 hr (nitrogen blanket) to expel water and then heated at 280° C. for 2 hr. Bubbling of the polymer film was noted. The polymer. 3 g. was a brown, brittle solid. Analysis of a KBr pellet of the polymer again showed changes similar to those of Example 2. The polymer was only partly soluble in water or methanol, giving a cloudy solution.

EXAMPLE 8

Thermodecarbonylation of PNVF-Presence of water-To a Paar bomb was added white PNVF (1.0 g) and water (1.0 g). The bomb was sealed and purged with $N_2$ several times. The mixture was heated at 280° C. for 30 min. A yellow water-soluble polymeric material was obtained. Analysis of the water-soluble polymer by NMR indicated 34% deformylation with 50% water added.

EXAMPLE 9

Thermolysis of PNVF film—2 hr. under steam—PNVF, 5 g (Ex. 1), was dissolved in 50 mL of water and poured into a 250 mL round bottom flask. The solvent was evaporated under reduced pressure on a rotary evaporator to give a polymer film on the flask. The polymer was heated at 280° C. for 2 hr under flowing steam and nitrogen. The polymer, 2.3 g, was a mixture of water swollen gel and solid, indicating reduced crosslinking. A KBr pellet of the polymer showed a broad, relatively featureless IR absorption from 1700 to 1400 $cm^{-1}$.

EXAMPLE 10

Thermohydrolysis of PNVF in water -- PNVF. 1 g (Ex. 1), was dissolved in 9 g of water (10% solution) and heated at 280° C. in a Paar reactor for 0.5 hr. resulting in a pressure of 340 psi. The cooled, homogeneous polymer solution was acidified with HCl to pH 1 and precipitated with acetone to give a fine white powder. The polymer was dried in a vacuum oven at 60° C. IR analysis of the polymer showed broad absorption at 1700 to 1300 $cm^{-1}$. NMR spectroscopy showed 62% hydrolysis/thermodecarbonylation.

EXAMPLE 11

Thermohydrolysis of PNVF-presence of water—PNVF prepared according to Example 1, 4 g, was dissolved in 16 g of water (20% solution) and heated in a Paar bomb at 280° C. for 0.5 hr. The polymer was precipitated from solution with acetone and vacuum dried at 60° C. The polymer was redissolved, acidified to pH 2 with HCl and reprecipitated. Analysis by NMR spectroscopy showed 24% hydrolysis of the formamide groups; formic acid, 10% on original PNVF. was also observed.

EXAMPLE 12

Thermohydrolysis of PNVF-99% water¼PNVF, 0.4 g, was dissolved in 40 g of water and heated in a Paar reactor for 0.5 hr at 280° C. The polymer was worked up as in Example 11 and showed 11% hydrolysis by NMR. Formate was also present.

PVAm produced by traditional acid or base hydrolysis of poly (N-vinylamides) is contaminated with substantial amounts of acid or base and coproduct salts. For applications which do not tolerate salts, further purification of PVAm is required. The present invention provides a process for producing "salt-free" PVAm. The by-products of the present process are CO and $HCO_2H$ which are readily removed.

STATEMENT OF INDUSTRIAL APPLICATION

Poly(N-vinylformamide) is thermolytically reacted to provide poly (vinylamine) which has substantial industrial application.

We claim:
1. In a method for preparing a vinylamine-containing polymer from a vinylamide-containing polymer, the improvement which comprises heating a vinylformamide-containing polymer in the absence of a base or an acid to a temperature sufficient to effect thermodecarbonylation.
2. The method of claim 1 in which the N-vinylformamide-containing polymer is heated in the presence of water.
3. The method of claim 1 in which the temperature is from 200° to 320° C.
4. The method of claim 1 in which the temperature is from 250° to 300° C.
5. A method for preparing a polymer containing polymerized vinylamine units which comprises thermolytically reacting a polymer containing polymerized N-vinylformamide units at 200°-300° C. in the presence of water but in the absence of an acid or base.
6. The method of claim 5 in which the reaction occurs at 250° to 300° C.

* * * * *